(12) United States Patent
Wurthner et al.

(10) Patent No.: US 8,521,379 B2
(45) Date of Patent: Aug. 27, 2013

(54) METHOD FOR OPERATING A VEHICLE HAVING A FREEWHEEL MODE OR A ROLLING MODE

(75) Inventors: Maik Wurthner, Markdorf (DE);
Johannes Kemler, Ravensburg (DE);
Joachim Staudinger, Ravensburg (DE);
Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 88 days.

(21) Appl. No.: 13/264,807

(22) PCT Filed: Mar. 5, 2010

(86) PCT No.: PCT/EP2010/052811
§ 371 (c)(1),
(2), (4) Date: Oct. 17, 2011

(87) PCT Pub. No.: WO2010/121861
PCT Pub. Date: Oct. 28, 2010

(65) Prior Publication Data
US 2012/0046841 A1    Feb. 23, 2012

(30) Foreign Application Priority Data
Apr. 21, 2009  (DE) .......................... 10 2009 002 521

(51) Int. Cl.
*G06F 7/00*        (2006.01)
(52) U.S. Cl.
USPC .................. 701/54; 701/53; 701/55; 477/107
(58) Field of Classification Search
USPC ............... 701/93, 96, 51–54; 477/34, 76–81, 477/92, 107
See application file for complete search history.

(56) References Cited

U.S. PATENT DOCUMENTS

| | | | |
|---|---|---|---|
| 5,941,925 A * | 8/1999 | Hess et al. ...................... 701/91 |
| 6,939,265 B2 | 9/2005 | Rustige et al. |
| 7,134,355 B2 | 11/2006 | Eriksson et al. |
| 7,223,204 B2 | 5/2007 | Steen et al. |
| 2004/0228946 A1 | 11/2004 | Yokoyama et al. |
| 2008/0243349 A1 | 10/2008 | Trautenberg |
| 2010/0286884 A1 | 11/2010 | Bunn |

FOREIGN PATENT DOCUMENTS

| | | |
|---|---|---|
| DE | 102 21 701 A1 | 11/2002 |
| DE | 10 2004 015 303 A1 | 10/2004 |
| DE | 10 2004 017 115 A1 | 10/2005 |
| DE | 10 2007 006 501 A1 | 8/2008 |

(Continued)

*Primary Examiner* — Yonel Beaulieu
(74) *Attorney, Agent, or Firm* — Davis & Bujold, PLLC

(57) ABSTRACT

A method of operating a vehicle in a freewheel mode or a rolling mode, in which the vehicle has a drive train comprising a controllable drive engine, an automatic or automated transmission, and a controllable shifter for interrupting a flow of power in the drive train. To enable fuel-efficient and low-emission, as well as safe and comfortable driving, it is intended that the freewheel mode or the rolling mode is prognostically activated, deactivated or retained by performing a plausibility check of a currently active, automatic driving speed control function or a driving speed and a distance control function and/or other current driving operation or driving state data. The method includes coordinating and adapting relevant marginal conditions of the active driving speed control function or the driving speed and the distance control function, and of the freewheel mode or the rolling mode, according to the driving situation, and initiating control measures by a transmission control.

16 Claims, 1 Drawing Sheet

(56) References Cited

FOREIGN PATENT DOCUMENTS

| | | |
|---|---|---|
| DE | 10 2007 036 794 A1 | 2/2009 |
| EP | 1 923 291 A2 | 5/2008 |
| EP | 1 975 029 A1 | 10/2008 |
| GB | 2 452 579 A | 3/2009 |
| WO | 03/037672 A1 | 5/2003 |
| WO | 2005/084995 A1 | 9/2005 |

* cited by examiner

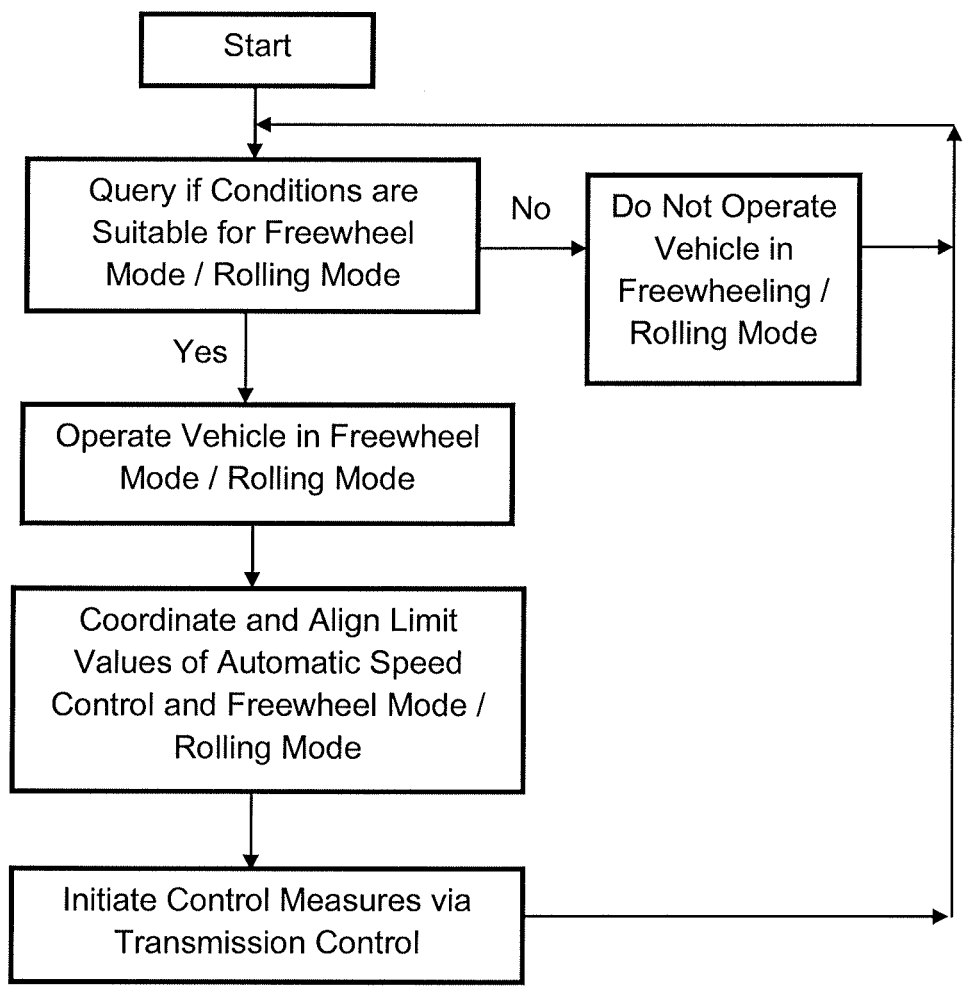

METHOD FOR OPERATING A VEHICLE HAVING A FREEWHEEL MODE OR A ROLLING MODE

This application is a National Stage completion of PCT/EP2010/052811 filed Mar. 5, 2010, which claims priority from German patent application serial no. 10 2009 002 521.9 filed Apr. 21, 2009.

FIELD OF THE INVENTION

The invention relates to a method for operating a vehicle in a freewheel mode or rolling mode, wherein the vehicle has a drive train comprising a controllable drive engine, an automatic or automated transmission, and controllable shift means for interrupting a flow of power in the drive train.

BACKGROUND OF THE INVENTION

The control of the drive undergoes continuous development with the objective of reducing the fuel consumption and exhaust-gas emissions of motor vehicles. A highly promising possibility for saving fuel involves interrupting the flow of power in the drive train in suitable driving situations and then temporarily operating the vehicle in a rolling mode with the drive engine rotating at idle speed, or even also turning off the drive engine and moving the vehicle in a so-called freewheel mode. These functions are already known.

A problematic aspect thereof, however, is that the detection mechanisms conventionally used to determine driving situations that are suitable for the freewheel mode or rolling mode, which rely primarily on evaluations of vehicle resistance and the roadway gradient, the movements of the gas pedal and the brake pedal, the current speed range, and vehicle acceleration, are often inadequate for always utilizing the freewheel/rolling mode in a reliable and expedient manner.

In particular, in the known control methods for a freewheel mode or rolling mode, the vehicle surroundings and the vehicle state are not always interpreted correctly using a sensor system available in the vehicle, due to a somewhat unfiltered or incomplete accounting for information on consumption-relevant variables and/or due to complex, partially contradictory influences, which can result in unnecessary and counterproductive neutral shiftings or interruptions in the flow of power in the drive train.

Furthermore, it is known to equip modern vehicles with automatic vehicle speed control functions or vehicle speed functions and distance control functions to an increasing extent, for reasons of comfort, traffic, and vehicle safety. Such systems are already available for passenger vehicles and commercial vehicles, for instance as a Tempomat unit (cruise control) which brings about or maintains a desired speed specified by the driver or, as an expansion thereof, as ACC (Adaptive Cruise Control) or ADR (Automatic Distance Regulation) which establish a monitoring region in front of the vehicle or around the vehicle using sensors such as radar, infrared, video, or ultrasound, whereby the distance, at the least, from the vehicle traveling directly in front is also adjusted via automatic deceleration or braking by means of an autonomous braking system (Bremsomat unit (brake control unit)).

DE 10 2004 017 115 A1 makes known a method for the automatic driving speed control and distance control for a vehicle comprising an automatic or automated transmission, in which the driving speed can be varied within the range of a preselected target speed. In that particular case, an acceleration phase is followed by a roll-out phase in which the flow of power in the drive train can be interrupted to save fuel. Topographical data, data from a monitoring device pertaining to the immediate vehicle surroundings, and/or vehicle parameters can be taken into account via a navigation device in the sequence of acceleration and roll-out phases. The acceleration phases can be supported by an electric motor which is present in addition to an internal combustion engine.

The known method uses a freewheel mode or rolling mode to control speed within a Tempomat unit or ACC system. The disadvantage thereof is that an independently controllable freewheel mode or rolling mode is not provided. In particular, neutral shiftings or engine shut-offs are bound to the requirements of the Tempomat unit or the Bremsomat unit. The possibilities for use of the freewheel mode or rolling mode are therefore somewhat limited.

DE 102 21 701 A1 makes known a control method for a motor vehicle comprising an automatic transmission, in which a clutch is disengaged, thereby interrupting the flow of power in the drive train if a gas pedal or a brake pedal, or actuating variables having like effect, are not actuated while the engine is running and the vehicle is traveling at a minimum driving speed. After the clutch is disengaged, the transmission is shifted into neutral and the vehicle is therefore in a rolling mode. When the gas pedal or the brake pedal is actuated, or variables having like effect are changed, the clutch is re-engaged, thereby terminating the rolling mode. Before the clutch is engaged, rotational speed synchronization takes place between the driving internal combustion engine and a drive shaft in order to terminate the rolling mode as comfortably and rapidly as possible. It is also provided that the clutch will not be disengaged and, therefore, the rolling mode will not be activated, if vehicle deceleration is imminent. This can be detected in the form of downhill driving or a rapid release of the gas pedal.

The disadvantage thereof is that a freewheel mode or rolling mode is not always appropriate when the vehicle is neither traveling downhill nor the gas pedal or brake pedal is actuated. In particular, prognostic parameters related to topography or the traffic situation, or that are internal to the vehicle are not taken into consideration in the method. In addition, a combined freewheel and rolling mode is not provided with a Tempomat unit or Bremsomat unit.

WO 2003/037 672 A1 makes known a multi-speed transmission, in particular for heavy commercial vehicles, which is shifted into neutral, i.e. into a rolling mode, when a low-consumption driving state is detected. A low-consumption driving state is detected and the neutral position is attained via shifting when a target speed is specified and the driving speed would decrease without the rolling mode. This is assumed, in particular, when neither the gas pedal nor the brake pedal are actuated, and equivalent variables do not change. A supplemental brake system which can be actuated in the rolling mode is provided for safety reasons. The gear that is currently engaged is also taken into consideration. The disadvantage thereof is that a prognostic evaluation of the rolling mode is not provided, and therefore unfavorable neutral shiftings can be triggered.

BRIEF DESCRIPTION OF THE DRAWING

The invention will now be described with reference to the sole drawing wherein the sole FIGURE is a flow chart depicting the method according the invention.

DETAILED DESCRIPTION OF THE PREFERRED EMBODIMENTS

Proceeding from this background, and as shown in the sole FIGURE, the problem addressed by the invention is that of providing a method that enables a vehicle comprising an automatic or automated transmission to be operated with low consumption and low emissions using an efficient, comfortable, and operationally reliable freewheel or rolling function.

The invention is based on the finding that a freewheel or rolling function can be applied very specifically in suitable situations to save fuel in a vehicle by utilizing an evaluation in which the most comprehensive and detailed relevant information possible pertaining to the immediate vehicle surroundings, the topography of the roadway, and current operating parameters of the vehicle are related to one another and weighted.

Accordingly, the invention relates to a method for operating a vehicle in a freewheel mode or rolling mode, wherein the vehicle has a drive train comprising a controllable drive engine, an automatic or automated transmission, and controllable shift means for interrupting a flow of power in the drive train. The stated problem is solved according to the invention in that the freewheel mode or rolling mode is prognostically activated, deactivated, or retained by performing a plausibility check of a currently active, automatic driving speed control function or driving speed and distance control function, and/or other current driving operation or driving state data or values derived therefrom, that relevant marginal conditions of the active driving speed control function or the driving speed and distance control function, and of the freewheel mode or rolling mode are coordinated and adapted as needed according to the driving situation, and that necessary control measures are initiated by a transmission control.

A rolling mode is understood to mean driving a vehicle with the drive train disengaged, i.e. non-driven forward driving or driving via flywheel momentum, with the drive engine running. A freewheel mode is understood to mean driving a vehicle with the drive train disengaged and the drive engine shut off.

Due to the method according to the invention, activations of the freewheel mode or rolling mode that are unnecessary or unwanted, and that may impair operating safety, are reliably prevented. In addition, suitable situations for activation of the freewheel or rolling function are reliably detected and appropriate adjustments are carried out as needed. As a result, the freewheel mode or rolling mode can be utilized more efficiently than before. Expansions and limitations of the freewheel or rolling function, which superpose the conventional detection mechanisms, are therefore made available. These expansions and limitations can be implemented relatively easily via a transmission control, i.e. a transmission control device which outputs relevant commands to an engine control, i.e. an engine control unit. Laborious interventions in the software of a Tempomat unit or Bremsomat unit controller are not required for this, which is cost-effective.

Sensor signals, provided they are available via existing Tempomat and Bremsomat units, a navigation device, etc., that are obtained by monitoring the immediate vehicle surroundings, and from navigation data are evaluated and subjected to a plausibility check. Furthermore, drive and engine parameters and the gradients thereof, which provide information about the vehicle itself, are taken into account, in particular those that tend to stand in the way of a reasonable neutral shifting or a temporary shutting off of the internal combustion engine for reasons of consumption, wear, or function.

Advantageously, the freewheel or rolling function is therefore not activated or deactivated if an impending active braking procedure relevant for distance control, an impending speed reduction relevant for distance control, high traffic density, rapidly changing traffic situations, a freewheel or rolling distance that is too short, and/or relatively hilly terrain is detected or forecast. The use of the freewheel mode or rolling mode to save fuel does not appear to make sense for these driving situations which are related to the vehicle surroundings or the roadway topography.

Advantageously, the freewheel or rolling function is also not activated or deactivated if any of the following are detected or predetermined: excessively high coolant temperature, acute or impending lack of fuel, a safety-relevant intervention by a control device into braking or the engine, an extreme steering maneuver, relatively high RPMs, a running engine fan, a gear step that was evaluated as inappropriate, a speed change that was evaluated as impermissible, and/or a control device error message. Under these operating parameters which relate to the vehicle itself, or in the presence of resulting operating behaviors, the freewheel mode or rolling mode would have an unfavorable effect due to the absence of engine drive.

In contrast, the freewheel or rolling function can be advantageously expanded by adapting or adjusting a marginal speed control on the transmission control side if a topography detection device detects or forecasts a dip in the upcoming roadway for the case in which the driving speed control function or the driving speed and distance control function is active.

In particular, it can be provided that a braking-relevant target speed of an ACC system is temporarily increased for the travel through the dip.

In the case of operation with a Tempomat unit without distance control or manual operation of the gas pedal by the driver, it can be provided that a likely increase in speed for the travel through the dip in the freewheel mode or rolling mode is calculated and compared with a stored, predetermined limit value, and the freewheel mode or rolling mode is then activated if necessary.

It can also be provided that, if the freewheel mode or rolling mode is active, the transmission control intervenes in the control of the drive engine in a manner such that the freewheel mode or rolling mode is exited and flow of power in the drive train that had been interrupted for that purpose is restored only if the current driving speed deviates from a specified speed range which contains a target speed of the driving speed control function or the driving speed and distance control function.

To prevent a Tempomat unit controller from briefly injecting too much fuel into the drive engine after termination of the freewheel mode or rolling mode, it is expedient for engine control to be performed by the transmission control instead of the internal combustion engine being controlled by a Tempomat unit controller, after the flow of power has been reestablished in the drive train and until a target speed of the driving speed control function or the driving speed and distance control function has been reached.

To enable the driving speed to fall below a target speed during a freewheel or rolling phase, and to therefore extend the freewheel or rolling phase and, after the freewheel or rolling phase, to demand the necessary drive torque at a more favorable operating point of the internal combustion engine, it is advantageous to temporarily reduce an acceleration-relevant target speed of the driving speed control function or the driving speed and distance control function.

Basically, a freewheel or rolling phase can be initiated in that an interruption in the flow of power in the drive train during driving is requested when a currently available positive engine torque and currently demanded engine torque losses increase at least approximately, and when a positive or negative acceleration forecasted for driving in the freewheel mode or rolling mode is evaluated as permissible.

To minimize frictional losses while the drive motor idles after the shift into neutral, it is also advantageous that the flow of power is interrupted by shifting a shift means or shift element close to the engine in the drive train. A start-up element that connects the drive engine to the transmission remains engaged, i.e. the neutral position is preferably shifted without disengaging the start-up element. In the case of a heavy commercial vehicle comprising a multi-group transmission, it is expedient that the flow of power is interrupted by shifting a shift means of a front-mounted group or a splitter group.

To elucidate the invention, a few scenarios in which the method according to the invention is used will be described below.

First, a few operating situations will be described in which the freewheel/rolling mode is not requested, or is reset:

In a first operating situation, the vehicle is cornering. A control device detects relatively intensive and frequent usage of the vehicle steering by evaluating signals from available wheel speed sensors and/or steering angle sensors. A plausibility check reveals whether the vehicle is situated in city traffic or on a very curvy route, such as a winding road. As is custom, brief rolling phases could be initiated here on flat and/or straight sections of roadway, although this would not be a good idea since frequent braking is to be expected, which would be supported by the engine braking action of the drive engine. According to the invention, the freewheel mode or rolling mode is therefore not activated in this scenario. In particular, this function is not requested by a shift program of the automatic or automated transmission or, if the freewheel mode or rolling mode was not previously activated, the function is reset and the flow of power in the drive train is re-established, i.e. a gear is engaged.

In a second operating situation, a vehicle traveling in front is detected via sensors of an active ACC control device or sensors specific to the transmission, in which case the distance to the vehicle traveling in front decreases. According to the invention, it is deduced that control or actuation of the service brake is imminent. Since it is reasonable that the engine brake action should support the service brake, the drive train remains engaged or is engaged, thereby disabling the freewheel mode or rolling mode. In an analogous manner, with the ACC system activated, the vehicle can be in the distance control mode, wherein the speed of a vehicle traveling in front, e.g. 60 km/h, is less than the specified target speed of the vehicle under discussion, which is 80 km/h, for example.

In a further operating situation, an evaluation of ACC distance sensors or information from a navigation system (e.g. GPS) reveals that the vehicle is situated in excessive traffic, i.e. a traffic jam. It is not wise to use the freewheel mode or rolling mode in this case, either. Since frequent start-up and braking is to be expected in this driving situation, it is plausible to utilize engine braking action and, therefore, a possible trailing throttle fuel cutoff which saves fuel.

In a further operating situation, an evaluation of navigation data (GPS) reveals that the vehicle is situated in city traffic. It is not wise to activate a freewheel or rolling function in city traffic since frequent acceleration and braking are required. In the trailing throttle state, engine braking action should preferably be utilized in addition, for the additional reason that no fuel is consumed in this case due to the trailing throttle fuel cutoff. The freewheel mode or rolling mode is therefore preferably deactivated in city traffic as well.

In a further operating situation, the vehicle is situated on very hilly terrain. This can be detected, for example, via a plane detection function by considering the past. To this end, the gradients on which the vehicle travels are evaluated via a gradient or tilt sensor, or via calculated gradient or vehicle resistance signals. A counter is incremented when the vehicle travels on a steep downhill or a steep uphill. The counter is decremented when the vehicle travels on a plane. If the counter status reaches an upper threshold value, it is deduced that the vehicle is traveling on hilly terrain. In this driving situation, it is reasonable to deactivate the freewheel or rolling function to prevent the frequent engagement and disengagement of gears in short intervals. The freewheel or rolling function is reactivated only when the vehicle has been situated on a plane for a longer period of time and this is detected via a counter status that is below a second threshold value.

Hilly terrain can also be detected via an evaluation of navigation data. A suitable transmission control system can evaluate the roadway situated in front of the vehicle on the basis of altitude data, inclination data, etc., and thereby calculate the average uphill grade and the average downhill grade. If this mean value is greater or lesser than a threshold value, the freewheel or rolling function is also shut off.

In a further operating situation, a truck that has traveled down a long downhill grade using an additional constant-braking device (secondary retarder) is now situated on a section having less of a downhill grade which transitions into a plane. The coolant temperature of the internal combustion engine has increased significantly due to the use of the constant-braking device. The freewheel mode or rolling mode could now be activated since the topography is suitable. To lower the coolant temperature of the internal combustion engine, it is expedient, however, to not interrupt the drive since a coolant pump used for engine cooling rotates more rapidly, i.e. operates more effectively, when the engine is coupled to the drive train than when the engine is idling or has been shut off entirely. The freewheel mode or rolling mode is therefore not activated in this operating situation.

In a further operating situation, after a commercial vehicle has traveled down a long downhill grade, the engine speed has exceeded a threshold value, e.g. 1400 RPMs. The use of a constant-braking device was requested during the travel downhill. To this end, a downshift was initiated to increase the engine speed, e.g. 2000 RPMs, in order to increase the cooling capacity. A neutral shifting of the transmission and, therefore, the freewheel mode or rolling mode, is suppressed and is not released until an upshift takes place, which usually precedes the transition into a traction mode.

In a further operating situation, an engine fan operates after a long steep downhill grade, during which a secondary retarder or the engine brake were used. The freewheel mode or rolling mode is temporarily deactivated, wherein a transmission control system continuously reads the speed of rotation or the operating status of the engine fan, e.g. via a CAN bus, and releases the freewheel or rolling function at a given point in time.

In a further operating situation, an evaluation of navigation data (GPS) reveals that a downhill grade located ahead of the vehicle will be too short for activation of a freewheel or rolling function. This could be the case, for example, if the downhill grade was detected as being suitable for a freewheel or rolling phase per se, but a drastic speed reduction will take place within a short distance, e.g. 30 meters ahead of the vehicle, due to a traffic sign (stop sign) or a stoplight (red light). Activation of a freewheel or rolling function is not permitted in this operating situation.

In another operating situation of a commercial vehicle, the downhill grade that exists at the moment may have been detected as suitable for a freewheel or rolling phase, but is so steep over a short distance that braking using a supplemental brake system (secondary retarder) and an engine brake is probably required. Activation of a freewheel or rolling function is not permitted in this operating situation, either.

In a further operating situation, a low fuel level is detected. For example, the fuel level is below a threshold value, or a reserve has been accessed, or a function internal to the transmission has deduced that the fuel level is low on the basis of the rotational speed behavior of the internal combustion engine that occurs during a shift procedure. The engine could stall when the drive train is disengaged, or it might not be possible to restart the engine after a freewheel phase ends. For safety reasons, the freewheel or rolling function is therefore deactivated, or the activation thereof is not permitted.

In a further operating situation, a transmission control device registers an error message. The drive train remains engaged or is engaged as a precaution in order to prevent a freewheel or rolling phase of the vehicle from occurring.

In a further operating situation, a control device of a safety or stability system, such as ABS (antilock braking system), TCS (traction control system), VDC (vehicle dynamic control), or ESP (electronic stability program), actively intervenes in the control of a braking device or in an engine control. In such an operating situation, the freewheel or rolling function is deactivated at least during the direct intervention, or a freewheel or rolling phase is not permitted to start.

In another operating situation, the vehicle is in a relatively low gear. The activation of the freewheel mode or rolling mode is released depending on the current gear step. For example, in a vehicle with group gearing, a shift into neutral takes place during travel only if a certain available gear, such as 12th gear, was reached.

In a further operating situation, the driving speed increases or decreases to a relatively great extent during a freewheel or rolling phase. Deactivation of the freewheel mode or rolling mode, i.e. re-engagement of a gear, is intended to take place in an operating situation in which the speed of the vehicle changes by more than a defined tolerance threshold while the transmission is shifted into neutral.

Operating situations are described below in which the activation or deactivation of the freewheel mode or rolling mode is expanded according to the invention, in particular with reference to a Tempomat unit or Bremsomat unit:

In one operating situation, via topography detection (e.g., GPS), a transmission control detects a dip, that is, a downhill gradient followed by an uphill gradient. In response thereto, the transmission control initiates a shift into neutral in order to utilize the freewheel or rolling function. According to the invention, the target speed of an active Bremsomat unit is simultaneously increased for a brief period of time by a transmission control device up to an adjustable maximum speed increase, wherein a driver's desire is briefly overruled so that the vehicle picks up speed and, therefore, momentum for the upcoming travel uphill.

In a comparable operating situation in which only a Tempomat unit, i.e. no distance control, is active, or if the driver actuates the gas pedal, a preliminary calculation of the extent to which the vehicle will gain speed in a rolling mode is carried out on the basis of the forecasted slope of the downhill gradient to the next uphill gradient lying ahead of the vehicle. This value is compared to a stored limit value. If the likely speed increase is less than or equal to the limit value, the shift into neutral is triggered. The limit value can be determined, e.g. on the basis of a Tempomat unit target speed or via the last current speed before a shift into neutral was triggered.

Finally, the regulation of the freewheel or rolling function carried out by the transmission control will be described in greater detail with reference to a Tempomat unit:

If the freewheel or rolling function is active, the particular target speed internal to the Tempomat unit is reduced. This can take place, in particular, by way of a request from a transmission control device. As a result, a decrease in the driving speed below a target speed of the Tempomat unit is permitted during the freewheel or rolling phase, thereby extending this freewheel or rolling phase. Once the freewheel or rolling phase ends, a relatively higher engine torque is required. An associated engine load point is now located in a more favorable consumption range, although with a higher load demand.

If the transmission is shifted into neutral by an automatic program, a transmission control device intervenes in the control of the drive engine such that the Tempomat unit becomes temporarily unable to demand engine torque. When the current speed is less than or greater than a set Tempomat unit speed by a certain amount, the transmission control device engages a gear and cancels the engine intervention. When a rolling phase is terminated, a control device of the Tempomat unit is provided with access to the engine control once more.

In that case, the transmission control device advantageously determines the engine control until the internal target speed of the Tempomat unit has been reached. Otherwise the Tempomat unit would demand of an engine control device that a quantity of fuel injected into the internal combustion engine be increased accordingly due to the fact that it registers a speed differential from the target speed thereof. Since this increase does not take place, however, since the transmission control device activates the freewheel mode or rolling mode and has sole access to the engine control, the increasing drop below the target speed would add up to a demand for continuously increasing quantities of fuel injected. When the freewheel mode or rolling mode ends, this would result in an abruptly elevated and inappropriate quantity of fuel injected. It is therefore expedient that the transmission and engine control unit, after operation in the freewheel mode or rolling mode, automatically adjusts the vehicle speed to the target speed of the Tempomat unit and then transfers the target speed requirement back to the Tempomat unit control device.

The invention claimed is:

1. A method of operating a vehicle in either a freewheel mode or a rolling mode for saving fuel, the vehicle having a drive train comprising a controllable drive engine, either an automatic or an automated transmission, and a controllable shift means for interrupting a flow of power in the drive train, the method comprising the steps of:
   one of prognostically activating, deactivating, and retaining either a freewheel mode or a rolling mode by performing a plausibility check of at least one of a currently active, an automatic driving speed control function, a currently active automatic driving speed and distance control function, a driving operation, and a driving state data;
   coordinating and adapting relevant marginal conditions of the at least one of either the active driving speed control function or the driving speed and distance control function, and of either the freewheel mode or the rolling mode depending upon a driving situation; and
   initiating control measures of the drive train by a transmission control.

2. The method according to claim 1, further comprising the step of either deactivating or refraining from activating the freewheel mode or the rolling mode if at least one of the following situations, resulting from either a vehicle surroundings or a roadway topography, is either detected or forecasted:
- impending active braking procedure that is relevant for distance control;
- impending speed reduction that relevant for distance control;
- high traffic density;
- rapidly changing traffic situations;
- short freewheel or rolling distance; and
- hilly terrain.

3. The method according to claim 1, further comprising the step of either deactivating or refraining from activating the freewheel or the rolling function if at least one of the following situations is either detected or forecasted:
- high coolant temperature;
- low fuel;
- either safety-relevant braking or engine intervention by a control device;
- extreme steering maneuver;
- high drive RPMs;
- an active engine fan;
- an inappropriate gear step;
- an impermissible speed change; and
- a control device error message.

4. The method according to claim 1, further comprising the step of adapting a marginal speed condition via the transmission control when
- either the automatic driving speed control function or the automatic driving speed and distance control function is active
- either the freewheel mode or the rolling mode should be either activated or retained, and
- a topography detection device either detects or forecasts a dip in an upcoming roadway.

5. The method according to claim 4, further comprising the step of temporarily increasing a braking-relevant target speed of the driving speed and distance control function for travel through the dip.

6. The method according to claim 4, further comprising the step of calculating and comparing a speed increase for travel through the dip in either the freewheel mode or the rolling mode with a stored, predetermined limit value, and activating the freewheel mode or the rolling mode based upon the comparison.

7. The method according to claim 1, further comprising the step of intervening, via the transmission control, in the control of the drive engine, if either the freewheel mode or the rolling mode is active, in a manner such that the freewheel mode or the rolling mode is exited and a flow of power in the drive train that had been interrupted for that purpose is restored only if the current driving speed deviates from a specified speed range which contains a target speed of the driving speed control function or the driving speed and distance control function.

8. The method according to claim 7, further comprising the step of controlling the engine by the transmission control when either the freewheel mode or the rolling mode is terminated, after the flow of power in the drive train has been re-established and until a target speed of either the driving speed control function or the driving speed and distance control function is reached.

9. The method according to claim 1, further comprising the step of temporarily reducing an acceleration-relevant target speed of the driving speed control function or the driving speed and distance control function.

10. The method according to claim 1, further comprising the step of requesting an interruption in the flow of power in the drive train during driving when currently available positive engine torque and currently demanded engine torque losses increase at least approximately, and when either a positive or a negative acceleration forecasted for driving in either the freewheel mode or the rolling mode is evaluated as permissible.

11. The method according to claim 10, further comprising the step of interrupting the flow of power by shifting the shift means, disposed adjacent to the engine in the drive train, while leaving a start-up element that connects the drive engine with the transmission engaged.

12. The method according to claim 11, further comprising the step of interrupting the flow of power by shifting the shift means of a front-mounted group if the vehicle comprises a multi-group transmission.

13. A method of operating a vehicle in either a freewheel mode or a rolling mode for saving fuel, the method comprising the steps of:
- providing the vehicle with a drive train comprising a controllable drive engine, either an automatic or an automated transmission, and a controllable shift element for interrupting a flow of power in the drive train;
- determining, via a transmission control device, a suitability of conditions, either surrounding the vehicle or within the vehicle, for running the vehicle in one a freewheel mode and a rolling mode, by performing a first plausibility check of at least one of:
  - a currently active, automatic speed control function,
  - a currently active automatic driving speed and distance control function,
  - a current driving operation, and
  - a driving state data,
- one of prognostically activating, deactivating, and retaining either a freewheel mode or a rolling mode based on the determination of suitability;
- taking into consideration a driving situation, coordinating and adapting relevant limit conditions between:
  - at least one of either the active driving speed control function or the driving speed and distance control function, and
  - either the freewheel mode or the rolling mode; and
- initiating control measures of the drive train via the transmission control device.

14. The method according to claim 13, further comprising the steps of
- operating the vehicle in freewheel mode only after the plausibility check determines conditions are suitable,
- maintaining the vehicle in freewheel mode until a determination is made that conditions are no longer suitable for the freewheel mode, and
- the freewheel mode comprising a sustained driving of the vehicle in a forward direction with the engine shut off.

15. The method according to claim 13, further comprising the steps of
- operating the vehicle in rolling mode only after the plausibility check determines conditions are suitable,
- maintaining the vehicle in rolling mode until a determination is made that conditions are no longer suitable for the rolling mode, and
- the rolling mode comprising a sustained driving of the vehicle in a forward direction with the engine running, but with a flow of power from the engine interrupted.

16. The method according to claim 13, further comprising the step of, if the plausibility check determines conditions are not suitable, preventing operation of the vehicle in the freewheel mode or the rolling mode.

\* \* \* \* \*